United States Patent [19]

Shillito et al.

[11] Patent Number: 4,728,300

[45] Date of Patent: Mar. 1, 1988

[54] SURFACE COVERING ALLOWING AN ELECTRIC RECEIVER TO BE SUPPLIED WITH POWER AT VARYING POSITIONS ON THE SURFACE

[75] Inventors: Richard P. Shillito, Gif sur Yvette; Maurice Behar, Paris; Jean-Louis Mutte, Montmorency, all of France

[73] Assignee: Heuga France S.A.R.L., Les Ulis Cedex, France

[21] Appl. No.: 916,842

[22] PCT Filed: Feb. 5, 1986

[86] PCT No.: PCT/FR86/00031

§ 371 Date: Oct. 8, 1986

§ 102(e) Date: Oct. 8, 1986

[87] PCT Pub. No.: WO86/04742

PCT Pub. Date: Aug. 14, 1986

[30] Foreign Application Priority Data

Feb. 8, 1985 [FR] France .................................. 85 01766

[51] Int. Cl.$^4$ ................................................ H01R 4/24
[52] U.S. Cl. ....................................................... 439/426
[58] Field of Search ............................................ 339/96

[56] References Cited

U.S. PATENT DOCUMENTS 2,625,621  1/1953  Roby ...................................... 339/96
3,401,469  9/1968  Shaver et al. .......................... 339/96
3,809,966  5/1974  Tirrell et al. ........................... 339/96

FOREIGN PATENT DOCUMENTS 571881 10/1958 Belgium ................................. 339/96

Primary Examiner—Joseph H. McGlynn
Attorney, Agent, or Firm—Richard P. Crowley

[57] ABSTRACT

A wall covering is provided for supplying an electric receiver with power at variable positions on the wall, which covering is in the form of elements such as a carpeting tile with textile wearing layer (10) and an underlying insulating foundation layer (12) under which are fixed two assemblies of conductors in the form of strips (14, 14') of opposite polarities, covered on their lower face with a covering sheet (15), the tile possibly including electric connection means such as projecting ends (16, 16') of the conducting strips, the strips being designed for supplying with two phase power a current sensor having contact needles passing through the wearing layer (10) and the insulating layer (12) so as to come into contact with the conducting strips.

16 Claims, 11 Drawing Figures

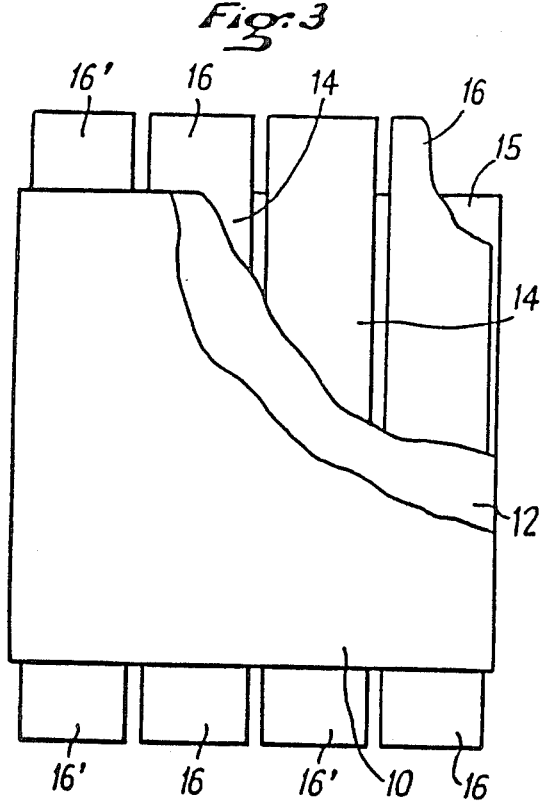
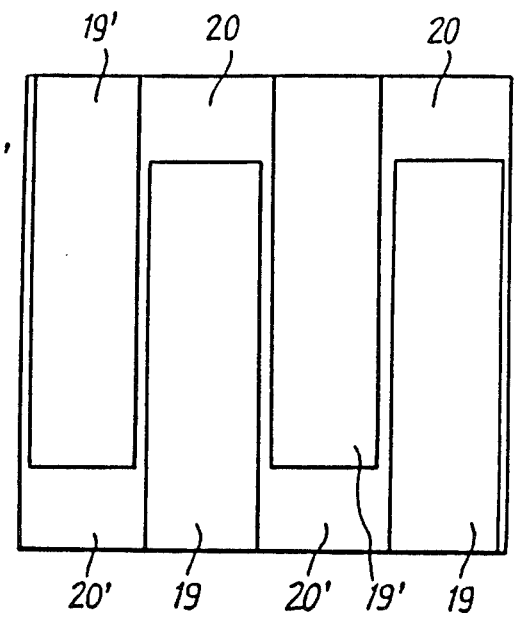
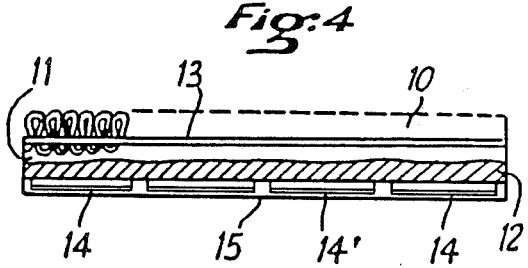
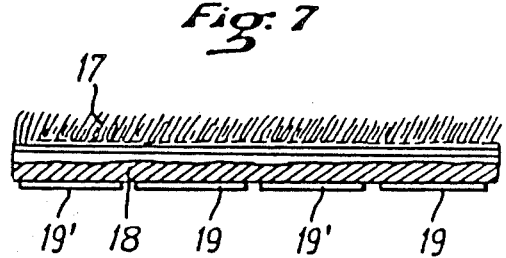
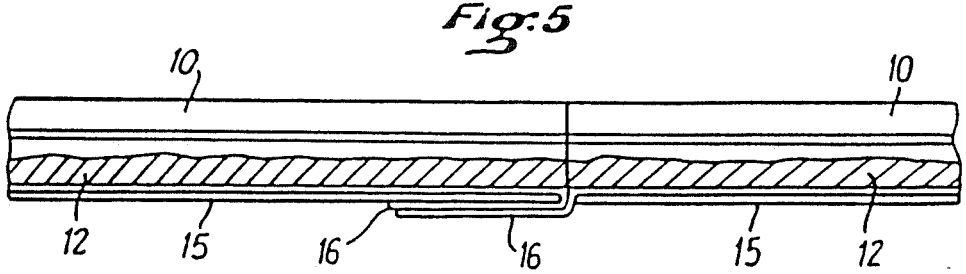

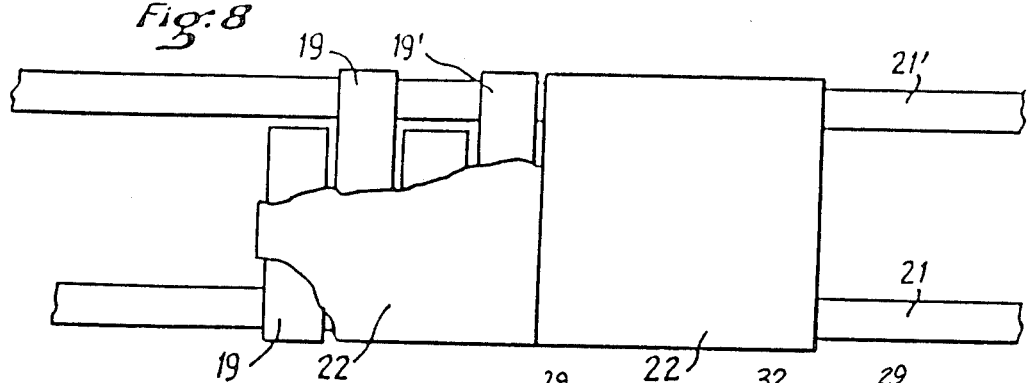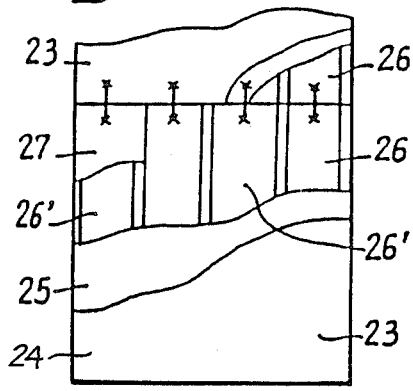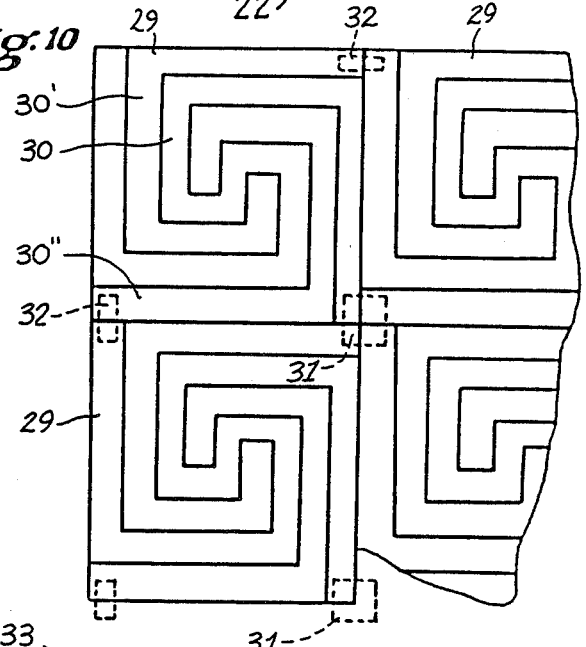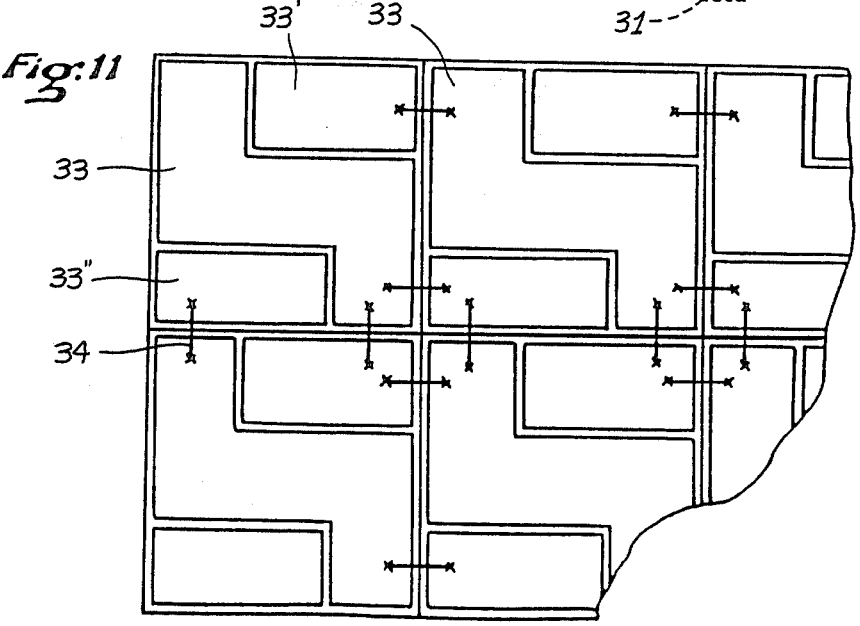

SURFACE COVERING ALLOWING AN ELECTRIC RECEIVER TO BE SUPPLIED WITH POWER AT VARYING POSITIONS ON THE SURFACE

FIELD OF THE INVENTION

The present invention relates to a wall covering, such more particularly as a floor covering, but also usable as wall covering, allowing an electric receiver able to occupy a variable position on the wall to be supplied with electric energy.

BACKGROUND OF THE INVENTION

The French patent applications No. 83 01742 filed on the Feb. 4, 1983, the European Pat. No. 84 400 243.6 filed on Feb. 3, 1984 and the U.S. patent application Ser. No. 591,495 filed on Mar. 20, 1984 and the inventors of which are Messrs. Johannes Andriessen and Daniel Gaillard, are incorporated in the present description by way of reference. These patent applications describe a device for supplying with power an electric receiver at variable positions on the surface, characterized in that it comprises on said surface, a network of conducting strips of the same width and spaced apart from each other, these strips being imbricated alternately in each other to form two assemblies, namely a first assembly of strips of even ranks connected to one pole of an electric power supply source and a second assembly of strips of uneven ranks connected to the other pole of the source, a variable position current sensor having at least two feelers able to contact the conducting strips and a switching circuit for supplying the receiver with power, this circuit having inputs connected respectively to the current feelers and an output connected to the receiver for supplying the receiver with power when at least two of the current feelers come into contact with two conducting strips belonging respectively to the first and second assemblies of strips connected to the two poles of the electric power source, the network of parallel conducting strips being covered with a layer of insulating material and the current feelers being in the form of metal contact needles the same length passing through the insulating material layer forming the upper covering applied to the conducting strips.

The conducting needles which are generally two or three in number and which, in this latter case are preferably disposed at the apex of an equilateral triangle may, with a suitable spatial arrangement, for example in the case where the height of the equilateral triangle is equal to the distance between the axes of the conducting strips, provide an electric connection with two adjacent conducting strips of different polarities and thus supply the receiver with power, practically for any position of the current sensor.

In accordance with the invention, the network of strips may be laid on the ground or floor and the layer of insulating material, which forms the upper covering applied to the conducting strips, may be a covering such as carpeting. In a variant, the strips may be fixed or bonded against a vertical wall and the insulating covering may be a furnishing fabric covering the wall.

This invention has great advantages to the extent that it is no longer necessary to connect a receiver which may be a domestic appliance or a lamp but also a typewriter, a computer or another office machine, to a fixed point such as a power socket.

It has however the drawback of requiring the network of conducting strips to be laid or fixed, which is an operation which must precede the hanging of the wall covering playing the role of insulating layer, and which must be carried out by staff specialized in electric installations.

SUMMARY OF THE INVENTION

The present invention proposes overcoming these drawbacks and providing a wall covering for supplying an electric receiver with power at variable positions on the surface which does away with this installation phase and avoids, to a large extent, the use of staff competent in the field of electric connections. It also provides a standardized covering able to be used in numerous applications.

The object of the invention is a wall covering for supplying an electric receiver with power at variable positions on the wall, particularly by means of a variable position current sensor having at least two feelers adapted to come into contact with conducting strips, said feelers being in the form of metal contact needles of the same length passing through an insulating material layer forming an upper covering applied to the conducting strips, said wall covering being characterized in that it is in the form of ready to lay elements, such an element including,

- an upper, more particularly textile, wearing layer forming the visible face of the covering,
- at least one layer of insulating material,
- two assemblies of conducting strips imbricated alternately in each other and able to be connected to the two poles of a power source, these two assemblies of strips being fixed, for example by bonding, under said insulating material layer, means being provided for ensuring the electric continuiy between two adjacent elements.

The covering elements which preferably have a uniform width may be formed of long lengths intended to be stuck or stretched, parallel to each other, on the wall and preferably being in the form of rolls which may be unrolled during hanging or laying.

The width of the length is preferably of the order of 90 cm to 5 m and their length may go for example up to 25 m.

In another embodiment, said elements are in the form of tiles, for example square or rectangular, able to be laid or applied on the wall at the side of each other in the manner of flagging.

The dimensions of the side of the tiles are for example some 25 cm to 2 m.

The surface coverings of the invention may advantageously be in the form of carpeting or similar floor covering. In a variant, they may also be in the form of a vertical wall covering.

The upper wearing layer made from textile material which may for example consist of a tufted, needled or woven layer, may be designed also for playing the role of the insulating material layer. However, it is preferable in accordance with the invention to use, as insulating layer, an underlaying layer on which the wearing layer is fixed or bonded.

In the case of elements of great length intended more particularly to be rolled up, the layer of insulating material may be a layer of foam or carpet felt extending under the textile wearing layer.

In the case of elements in the form of tiles, for which it is preferable to obtain a certain perpendicularity and rigidity, the insulating material layer may advantageously be formed of a foundation layer, for example a tarred layer or a layer of a material such as PVC.

The conducting strips may be formed from a suitable conducting material, for example aluminium, and they are advantageously disposed at the side of each other so that the gap between two adjacent strips is small, compared with the width of the strip, while being greater than the diameter of a contact needle so as to avoid any risk of short circuits. By way of example, the strips may have a width of the order of 10 to 20 cm.

The conducting strips which may possible have on one of their two faces a fine insulating paper are applied, preferably directly, under the insulating layer for example by bonding. They may however also be embedded in the insulating material layer, particularly when it is a tarred or plastic material layer.

Preferably, the coating element has, on its lower face, a sheet or film intended to be applied against the wall such for example as a non woven synthetic fiber sheet, this sheet then advantageously playing the role of insulator between the conducting strips and the wall itself.

The strips of the two assemblies of an element may extend alternately and parallel to each other over the whole length of an element. Such an arrangement is preferable, particularly in the case of elements of a long undefined length.

They may however also have imbricated forms, for example spiralled, and such an arrangement may be particularly advantageous for example in the case of square or rectangular tiles, because in these cases it provides connection more particularly at the four corners of the tiles. Other imbricated forms may of course be used.

The means for providing the electric continuity between two adjacent elements may be means external to the element and that may be advantageous to the case for elements of undefined length, in which case the strips preferably extend rectilinear and parallel to each other.

However, in a very advantageous embodiment, the connecting means may also form part of the element, such an embodiment being particularly advantageous in the case of tiles more particularly square or rectangular. Thus, the strips may advantageously project for a certain distance beyond the periphery of the tiles so as to obtain superimposition of the projecting ends of the strips of two adjacent tiles, one of the ends for example being folded back under the tile which carries it and being applied to the unfolded end of the strip of the adjacent tile.

In another embodiment applicable to tiles more particularly, the electric connection may be provided for example for a row of tiles, by two independent strips disposed under the row, parallel to each other and against which the lower faces, which are then covered, of the respective assemblies of strips of the tiles of the row are applied.

In an improvement of the invention, some of the conducting strips may have a specialized function for example the function of telephone or data processing lines or alarm signal lines or signal lines coming from a sensor. As a variant, in addition to the strips for supplying receivers with electric power, the elements of the invention may include other conductors which may possibly not be in the form of a strip such as coaxial conductors or similar.

In the case more particularly of elements, in the form of tiles, electric apparatus such as sockets, alarm or temperature or other sensors, light indicators, illumination devices, etc may be included in the tile either directly in the thickness or by forming a relief on the tile.

BRIEF DESCRIPTION OF THE DRAWINGS

Other advantages and characteristics of the invention will be clear from the following description given by way of non limitative example with reference to the accompanying drawings in which:

FIG. 3 shows a top view with parts cut away of a floor covering tile of the invention, FIG. 4 shows a cross sectional view, with exaggeration of the thickness of this tile, FIG. 5 shows a cross sectional view, with exaggeration of the thickness, of two electrically connected adjacent tiles, FIG. 6 shows a bottom view of a tile in another embodiment of the invention, FIG. 7 shows a cross sectional view, with exaggeration of the thickness, of the tile of FIG. 6, FIG. 8 shows a top view of several tiles according to FIG. 6, connected electrically together, FIG. 9 shows a top view with parts cut away of a tile in another embodiment of the invention, FIG. 10 shows a bottom view of an assembly of several tiles in another variant of the invention, and FIG. 11 shows a bottom view of several tiles in another variant of the invention.

Figure 1:
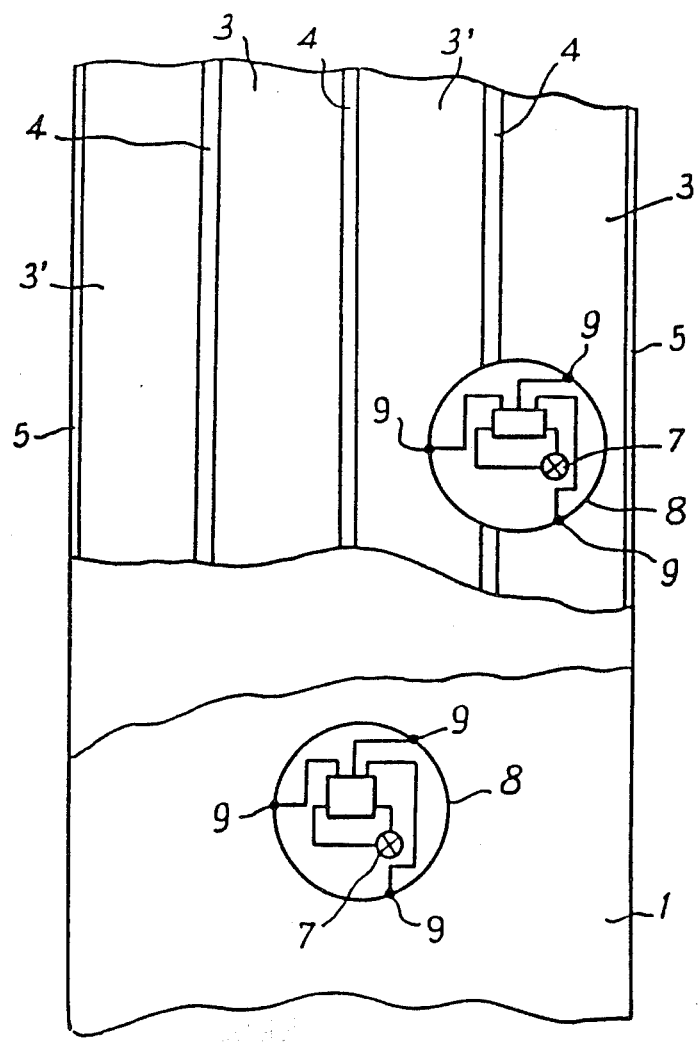
FIG. 1 shows a top view with parts cut away of a length of carpeting in accordance with the invention.
Figure 2:
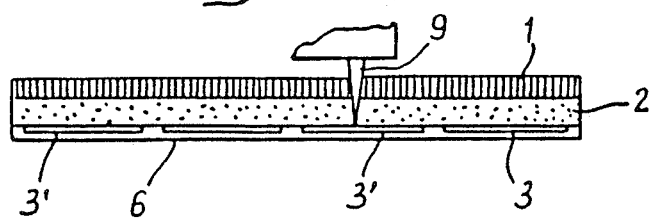
FIG. 2 shows a cross sectional view, with exaggeration of the thickness, of this carpeting.

Reference will be made first of all to FIGS. 1 and 2.

DESCRIPTION OF THE EMBODIMENTS

The element of the invention is in the form of a length of carpeting comprising a textile, for example tufted, wearing layer 1 bonded to an underlying electrically insulating foam 2 such as a PVC foam. The thickness of the textile wearing layer 1 is for exmple 8 mm and the thickness of the foam layer 2 is 5 mm.

Under the lower face of the foam layer 2 are bonded four parallel metal strips 3, 3' separated from each other by gaps 4, the two end strips being also offset from the respective edge of length 1 by a gap 5 having half the width of gap 4, so that, when several lengths 1 are juxtaposed, they define an assembly f parallel strips separated by equal intervals.

The strips have, for example, for a length of 90 cm in width, a width of 6 cm, so that each gap 4 has a width of 6 cm. The thickness of the strips is advantageously 5/10 mm.

The strips 3, 3' may be advantageously covered, under their lower faces, with a layer or sheet of insulating material 6 such for example as a non woven sheet of polyesterpolypropylene having a thickness for example of the order of 1 mm.

The strips 3, 3' are disposed alternately, all the strips 3 being intended to be connected to one pole of a power supply source, strips 3' to the other pole of this source. If the floor of a room is covered with several parallel and juxtaposed lengths such as those shown in FIG. 1, means may be provided for electrically connecting the strips 3 of the assembly of lengths and strips 3' of the assembly of lengths to their respective polarities. This may be provided by any suitable means, for example by extending two current carrying strips over ground transversely with respect to the direction of strips 3, 3′, the connection of strips 3 with one of these two strips and of strips 3′ with the other of these two strips being provided for example by metal stapling.

In a variant, by way of example, a lower layer 6 need not be provided so that strips 3 have a lower visible face which may be applied against suitably disposed conductors connected to the two poles of the power supply source. Also in a variant, the covering 6 may be provided so as to be readily removed over any length for facilitating connection.

The electric receiver may for example be a lamp of a lighting appliance, shown schematically by the reference 7 and carried by a flat circular base 8, having three metal points 9 disposed at the three apices of an equilateral triangle whose height is substantially equal to the distance between the centers of two adjacent strips, that is to say the distance between the axes of these two strips. The three needles 9 are connected respectively to the three inputs of the switching circuit, such as described for example in one of the above mentioned patent application, and formed in a way known per se so that the receiver 7 is supplied with power when at least two needles 9 are brought into contact with two strips 3, 3′ of opposite polarities.

In FIG. 2 a needle 9 has been shown schematically passing through the carpeting so that its point pierces through strip 3′ and provides the electric connection.

In the embodiment described, as well as in the rest of the invention, the conducting strips are fed from an electric power source, preferably a low voltage AC source but which may also for example be a source at the voltage of the means, for example the 220 V mains.

It will be readily understood that it is unlikely, for any position of support 8 on the wall covered in accordance with the invention, not to be able to obtain the power supply and if such were the case the user would only have to slightly move the support and drive in needles 9 so as to be sure of obtaining a power supply.

Reference will now be made to FIGS. 3, 4 and 5.

In these Figures a carpeting tile has been shown, in accordance with the invention, of square shape with a side of 90 cm.

The tile has an upper tufted textile wearing layer 10 joined by a connecting layer 11 to a tarred or PVC foundation layer 12. The support layer used for forming the tufted layer 10 has been shown at 13. The thickness of layer 10 is 8 mm and the thickness of layer 12 4 mm.

Under the tarred layer 12 have been bonded the upper faces of four strips 14 and 14′ of alternate polarities coated on their lower face with an insulating paper sheet. Finally, on the assembly of the four strips, a polyesterpolypropylene sheet 15 similar to sheet 5 has been bonded.

As can be seen, strips 14, 14′ extend from each side of the tile while forming free ends 16, 16′. These ends are used, as can be seen in FIG. 5, for providing the electric continuity of the strips having the same polarities of two adjacent tiles disposed in the longitudinal alignment of the tiles. Thus, end 16 (or 16′) of the strips of the left hand tile have been folded back under the tile so that its visible face, not covered with paper, is oriented downwardly. It is thus laid on the upper face, not covered with insulating paper, of the end 16 or (16′) of the adjacent right hand tile which has not been folded back.

In FIG. 5, the end overlaps 16 thus obtained form an extra thickness but it should be understood that this extra thickness is greatly exaggerated for the sake of understanding of the drawings and in practice, the assembly of tiles rests on the underlying floor and the end overlaps 16 cause no discernible overthickness.

In this embodiment, the different tiles of a row are connected electrically together by superimposing their respective ends 16, 16′. The result is that in this case, along a succession of strips situated in the same alignment, a great number of contacts are obtained which may cause electric losses.

In a variant, in the embodiment shown in FIGS. 6 to 8, a carpeting tile has therefore been provided having for example a tufted wearing layer 7 and being bonded against a tarred foundation layer 18 whose lower face has four strips 19, 19′ of alternate polarities. As can be seen, the strips stop alternately at a certain distance from the corresponding end, that it is to say the edge, of the tile so as to leave free gaps 20, 20′. Furthermore, in this tile there is no lower covering, such as covering 15, the metal lower surface of strips 19, 19′ being visible.

These tiles may be disposed in rows, above two conductors in the form for exmaple of continuous metal strips 21, 12′ laid, bonded or otherwise fixed to the floor. Two tiles 22 similar to the one shown in FIG. 6 have been shown juxtaposed. It can be seen that conductor 21 having one of the polarities may be covered by the ends of the conductors 19 associated with the same polarity whereas strips 19′ of the other polarity, because of spaces 20′ cannot come into contact with conductor 21 and vice versa.

Reference will now be made to FIG. 9.

In this Figure, another tile 23 has been shown having a wearing layer 24, an insulating layer 25 under which is bonded a plurality of strips 26, 26′ which, contrary to strips 19, 19′, extend over the whole width of tile 23. It can be seen that the strips of two adjacent tiles 23 are connected together by conducting staples for connecting together two successive strips 26 (or 26′) so as to provide good electric continuity. In this case, as in the case of FIG. 3, because of the covering, an assembly or conductors is obtained in the form of alternately imbricated parallel strips, of different polarities and extending rectilinearly over the whole of a dimension of the room receiving the covering.

Reference will now be made to FIG. 10.

In this embodiment, four square tiles 29, have been shown seen from their lower faces. These tiles have, like the preceding ones, a wearing layer and an insulating layer (not shown). Each tile has, under the insulating layer bonded thereagainst, three flattened conductors in the form of strips disposed in concentric spirals, namely conductor 30 which extends from the left hand edge (in the drawing) to the right hand edge of the tile and two conductors of identical polarities opposite those of conductor 30, namely conductors 30′ and 30″ separated from each other by conductor 30.

For the sake of simplicity the small free gaps existing between the respective conductors 30′, 30 and 30″ have not been shown in the drawings. It can be seen that with these arrangements two adjacent conductors are always of opposite polarities and that the conductor 30 of one of the tiles will have a polarity opposite that of the conductors 30 of the adjacent tiles disposed at its sides and a polarity identical to that of conductor 30 of the tiles which are opposed thereto through a common apex The connections between tiles are provided at the common apices by means of a connecting element 31 which may for example be a square conducting plate or a set of staples. In so far as the tiles are concerned which are disposed at the periphery of the covering, connecting means 32 allow a conductor 30' or 30" to be connected to a conductor 30 of the adjacent tile.

Reference will now be mde to FIG. 11.

Tiles have been shown which also each have three conductors 33, 33' and 33", conductor 33 having a polarity opposite that of conductors 33' and 33" on the same tile. Conductor 33 has an S shape and conductors 33' and 33" form rectangles. Connecting means such for example as staples 34, disposed in the same manner as in FIG. 10 provides the connection and it can be seen that the polarities of two conductors 33 of two tiles adjacent by a common side are different whereas the polarities of two tiles 33 opposed by the apex are identical. The form of strips 33, 33' and 33" is particularly well adapted to tiles of smaller dimensions, for example tiles of 50×50 cm or 25×25 cm.

Of course, the geometrical arrangement of the conductors may be different, the essential thing being that the strips are alternated so as to present different polarities allowing two polarities to be obtained providing the electric power supply for practically any position of the current sensor such as sensor 8.

It will be further understood, as has been seen, that certain conducting strips may be used for specific uses different from the electric power supply, for example for the passage of telephone, data processing signals coming from sensors or control signals, etc.

Finally, any appliances or devices which will appear in relief or may even be inlaid in the tiles if their reduced thickness allows it may be permanently fixed to the covering elements of the invention, and particularly the tiles. These appliances may for example be power sockets, switches, sensors etc.

Although the invention has been described in connection with a particular embodiment, it should be understood that it is in no wise limited thereto, and different modifications of form, or material may be made thereto without departing from the scope or spirit of the invention.

We claim:

1. A carpet tile surface covering for supplying an electric receiver with power at variable positions on said surface by means of a variable position current sensor having at least two feelers able to contact conducting strips beneath the surface covering, said feelers being in the form of metal contact needles passing through an insulating material layer forming an upper covering applied to said conducting strips, said covering being characterized in that it is in the form of ready-to-lay elements and comprising:
   (a) a fibrous layer (1, 10, 17, 24) having an upper surface forming the visilbe face of the covering;
   (b) at least one insulating material layer (2, 12, 18, 25) integrally bonded to the lower surface of the upper layer;
   (c) two assemblies means of generally flat, wide conducting strips (3, 3'-14, 14' 19, 19' 30, 30', 30"-33, 33', 33") adapted to be connected to a power supply source, these two assemblies means being fixed under said insulating material layer the said strips of generally equal width and of alternating different electrical polarities, and each of said strips in the same general plane and generally equally spaced apart from each other by a small, free gap; and
   (d) connecting means to provide for ensuring the electric continuity between two adjacent elements.

2. The covering according to claim 1, characterized in that the insulating material layer is a layer of foam or carpet felt (2).

3. The covering according to claim 1, characterized in that the means providing the electric continuity between two adjacent elements include conducting staples or plates.

4. The covering according to claim 1, charactertized in that it includes conducting strips having a specialied function and comprises permanently fixed electric appliances.

5. The covering according to claim 1, which includes a variable position sensor means, said means having three, generally equally spaced apart, triangular feelers to receive electrical current from the two assemblies means.

6. A surface covering which comprises a plurality of carpet tiles of claim 1 dispersed in an adjacent floor covering position to cover a defined floor area.

7. The covering according to claim 1, characterized in that it is in the form of square or rectangular shaped tiles.

8. The covering according to claim 7, characterized in that the strips are covered, under the tile, with a covering film or sheet (6, 15, 27).

9. The covering according to claim 7, characterized in that the strips extend parallel in one of th edirections of the element.

10. The covering according to claim 9, characterized in that the means providing the electric continuity include extensions (16, 16') of the strips (14, 14') extending beyond the edges of the tile and able to be folded back under the tile.

11. The covering according to claim 9, characterized in that the strips (19, 19') of the two assemblies means are of different polarities end respectively, at one of their ends, at a certain distance from the corresponding edge of the tile so as to leave free areas (20, 20') for providing the electric connection of the two assemblies by means of two conductors of opposite polarities (21, 21') extending transversely to the strips of the tile.

12. The covering according to claim 7, characterized in that the strips (30, 30', 30") are in the form of an imbricated spiral.

13. The covering according to claim 12, characterized in that one of the strips (30) extends spirally from one of the edges of the tile towards the other and separates, one from the other, two strips (30', 30") having polarities opposite the strip (30).

14. The covering according to claim 12, characterized in that it includes a central S-shaped strip (33) extending from one edge to the other of the tile and separating two rectangular strips 33', 33") having polarity different from the strip (33).

15. The electronic system, which comprises:
   (a) a surface covering of claim 1;
   (b) an electrical pwoer supply source in electrical communication with the two assemblies means;
   (c) a variable position sensor means to receive electrical power from the two assemblies means; and
   (d) an electrical device means to receive electrical power from the sensor means.

16. The covering according to claim 15 wherein the variable position sensor means comprises three, equal length feelers to penetrate the upper layer and to make contact with adjacent conductive strips of different polarity.

* * * * *